US010315544B2

(12) United States Patent
Miyawaki et al.

(10) Patent No.: US 10,315,544 B2
(45) Date of Patent: Jun. 11, 2019

(54) VEHICLE SEAT

(71) Applicants: TS TECH CO., LTD., Asaka, Saitama (JP); HONDA MOTOR CO., LTD., Minato-ku, Tokyo (JP)

(72) Inventors: Kazuya Miyawaki, Tochigi (JP); Atsushi Okimura, Tochigi (JP); Takahide Aoki, Tochigi (JP); Hiroki Ikeda, Wako (JP); Toshimitsu Mizukoshi, Wako (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/630,178

(22) Filed: Jun. 22, 2017

(65) Prior Publication Data

US 2017/0368975 A1    Dec. 28, 2017

(30) Foreign Application Priority Data

Jun. 24, 2016   (JP) ................................ 2016-125332

(51) Int. Cl.
*B60N 2/68* (2006.01)
(52) U.S. Cl.
CPC ............. *B60N 2/686* (2013.01); *B60N 2/682* (2013.01); *B60N 2/688* (2013.01)
(58) Field of Classification Search
CPC ......... B60N 2/686; B60N 2/688; B60N 2/682
See application file for complete search history.

(56) References Cited

U.S. PATENT DOCUMENTS

| 3,899,211 A | * | 8/1975 | Barecki | ................... | B60N 2/012 |
| | | | | | 296/63 |
| 4,493,505 A | * | 1/1985 | Yamawaki | ........... | B60N 2/3013 |
| | | | | | 296/63 |
| 5,658,048 A | * | 8/1997 | Nemoto | .................. | B60N 2/682 |
| | | | | | 297/410 |

(Continued)

FOREIGN PATENT DOCUMENTS

| CN | 1439547 A | 9/2003 |
| CN | 103040267 A | 4/2013 |

(Continued)

OTHER PUBLICATIONS

Office Action issued for Chinese Patent Application No. 201710485628.9, dated Jan. 3, 2019, 10 pages including English translation.

*Primary Examiner* — Timothy J Brindley
(74) *Attorney, Agent, or Firm* — Hamre, Schumann, Mueller & Larson, P.C.

(57) ABSTRACT

Vehicle seat with seat cushion and seat back includes a seat frame, which comprises: first and second frames disposed at a distance away from each other in a predetermined direction; third frame connecting end portions of the first and second frames; fourth frame connecting another end portions of the first and second frames; and a connecting frame disposed at distances away from the first frame and second frame and connecting the third frame and fourth frame. The seat frame comprises: first pipe member having a U-shaped configuration and configured to form the first frame, the connecting frame, and part of the third frame by which the first frame and the connecting frame are connected; and second pipe member having a U-shaped configuration and configured to form the second frame, a remaining part of the third frame and the fourth frame, and connected to the first pipe member.

20 Claims, 8 Drawing Sheets

(56) References Cited

U.S. PATENT DOCUMENTS

| | | | | |
|---|---|---|---|---|
| 5,775,780 A * | 7/1998 | Murphy | ................ | B60N 2/0825 |
| | | | | 297/216.18 |
| 5,829,831 A * | 11/1998 | Sharman | ................... | B60N 2/36 |
| | | | | 297/378.12 |
| 6,352,311 B1 * | 3/2002 | Hayotte | ................. | B60N 2/682 |
| | | | | 29/421.1 |
| 6,742,847 B2 | 6/2004 | Yanai | | |
| 6,981,748 B2 * | 1/2006 | Garnweidner | ....... | B60N 2/5825 |
| | | | | 297/218.1 |
| 7,753,443 B2 * | 7/2010 | Uchida | ................ | B60N 2/3013 |
| | | | | 297/216.1 |
| 8,061,779 B2 * | 11/2011 | Nakagaki | ............... | B60N 2/686 |
| | | | | 297/440.2 |
| 8,267,479 B2 * | 9/2012 | Yamada | ................... | B60N 2/22 |
| | | | | 297/452.18 |
| 8,931,850 B2 * | 1/2015 | Mitsuhashi | .............. | B60N 2/68 |
| | | | | 297/452.18 |
| 9,340,135 B2 * | 5/2016 | Sakkinen | ............. | B60N 2/4235 |
| 9,776,538 B1 * | 10/2017 | Cheng | .................... | B60N 2/682 |
| 2003/0160482 A1 * | 8/2003 | Yanai | ................... | B60N 2/3013 |
| | | | | 297/216.13 |
| 2011/0163587 A1 * | 7/2011 | Kmeid | ..................... | B60N 2/68 |
| | | | | 297/452.2 |
| 2013/0093226 A1 | 4/2013 | Mitsuhashi et al. | | |
| 2017/0259719 A1 * | 9/2017 | Hamano | ................... | B60N 2/68 |
| 2017/0313223 A1 * | 11/2017 | Tomita | ................... | B60N 2/809 |
| 2017/0368974 A1 * | 12/2017 | Yonehara | .............. | B60N 2/682 |

FOREIGN PATENT DOCUMENTS

| | | | | |
|---|---|---|---|---|
| JP | 2001171408 A | | 6/2001 | |
| JP | 2009255852 A | * | 11/2009 | ............... B60N 2/36 |

\* cited by examiner

VEHICLE SEAT

CROSS REFERENCE TO RELATED APPLICATIONS

The present application claims priority from Japanese Patent Application No. 2016-125332 filed on Jun. 24, 2016, the disclosure of which is incorporated herein by reference in its entirety.

TECHNICAL FIELD

The present invention relates to a vehicle seat comprising a seat cushion and a seat back.

BACKGROUND ART

As a conventional seat frame for a vehicle seat, JP 2001-171408 A discloses a seat frame, which comprises a U-shaped main pipe, an under pipe extending in a lateral direction and joined to the main pipe to connect lower end portions of the main pipe, and a sub-pipe extending in an upper-lower direction and joined to connect an upper portion of the main pipe and a portion of the under pipe which is on or in the proximity of a center portion of the under pipe.

However, the conventional seat frame includes a number of parts for constituting the seat frame, which disadvantageously leads to an increase in workload for assembly of the seat frame and an increase in weight of the seat frame.

In view of the above, it would be desirable to provide a vehicle seat which can be comprised of a reduced number of parts for the seat frame to decrease the workload on the assembly and to reduce the weight of the seat frame.

SUMMARY

According to a first aspect, there is provided a vehicle seat including a seat cushion and a seat back. The vehicle seat comprises a seat frame, which comprises: a first frame and a second frame disposed at a distance away from each other in a predetermined direction; a third frame connecting an end portion of the first frame and an end portion of the second frame; a fourth frame connecting another end portion of the first frame and another end portion of the second frame; and a connecting frame disposed at distances away from the first frame and the second frame and connecting the third frame and the fourth frame. The seat frame comprises: a first pipe member having a U-shaped configuration and configured to form the first frame, the connecting frame, and a part of the third frame by which the first frame and the connecting frame are connected; and a second pipe member having a U-shaped configuration and configured to form the second frame, a remaining part of the third frame, and the fourth frame, the second pipe member being connected to the first pipe member.

With this configuration, the number of parts for the seat frame can be reduced, so that the workload on the assembly can be reduced and the weight of the seat frame can be reduced. Further, a higher stiffness of the seat frame is ensured with a simple structure.

In the above-described vehicle seat, the seat frame may comprise a plate member connected to at least one of the first pipe member and the second pipe member. The plate member may comprise: at least one first protruding portion configured to protrude toward an occupant side that is a side of the vehicle seat on which an occupant is to be seated, the at least one first protruding portion extending in a direction orthogonal to the predetermined direction; and at least one second protruding portion configured to protrude toward the occupant side and extending in a direction inclined with respect to the predetermined direction.

With this configuration, the plate member constituting the seat frame can be configured to have an increased stiffness, so that the stiffness of the seat frame can be improved. Especially, the direction in which the first protruding portion extends is different from the direction in which the second protruding portion extends, so that the stiffness of the seat frame can be further improved. Further, optimal stiffness can be set for each of portions of the seat frame by arranging the first protruding portion and the second protruding portion.

In the above-described vehicle seat, the plate member may further comprise at least one third protruding portion configured to protrude toward the occupant side and having a triangular shape as viewed from the occupant side.

With this configuration, optimal stiffness can be set for each of portions of the seat frame by arranging the third protruding portion having a triangular shape.

The above-described vehicle seat may further include a seat belt, a seat belt retractor configured to retract the seat belt, and a bracket by which the seat belt retractor is attached to the seat frame, and the bracket may be provided on the connecting frame.

In order for the bracket to be attached, the conventional vehicle seat has a lateral frame provided between the upper frame and the lower frame and extending in a lateral direction. In contrast, according to the above vehicle seat, the bracket for attaching the seat belt retractor to the seat frame is provided on the connecting frame, and the lateral frame can be eliminated, so that an increase in the number of parts can be suppressed. Further, an occupant seated on the vehicle seat does not experience an uncomfortable contact feeling of the lateral frame, so that the occupant's seating feeling can be improved.

In the above-described vehicle seat, the seat frame may further comprise a plate member joined to the connecting frame through a plurality of joint portions, and the bracket may be disposed between two adjacent joint portions.

With this configuration, the attachment strength of the bracket can be improved.

In the above-described vehicle seat, the seat frame may further comprise a plate member connected to at least one of the first pipe member and the second pipe member, the bracket may comprise an attachment portion attached to the connecting frame, and the attachment portion may be disposed between the connecting frame and the plate member.

With this configuration, the attachment portion of the bracket can be arranged compactly, so that, for example, the thickness of a pad material disposed between the occupant and the seat belt retractor that is attached to the bracket can be increased. This can improve the occupant's seating feeling.

Other features and advantages of the present invention will be apparent from the following description taken in conjunction with the accompanying drawings.

DETAILED DESCRIPTION

One preferred embodiment of the present invention will be described in detail with reference to the appended drawings.

Figure 1:
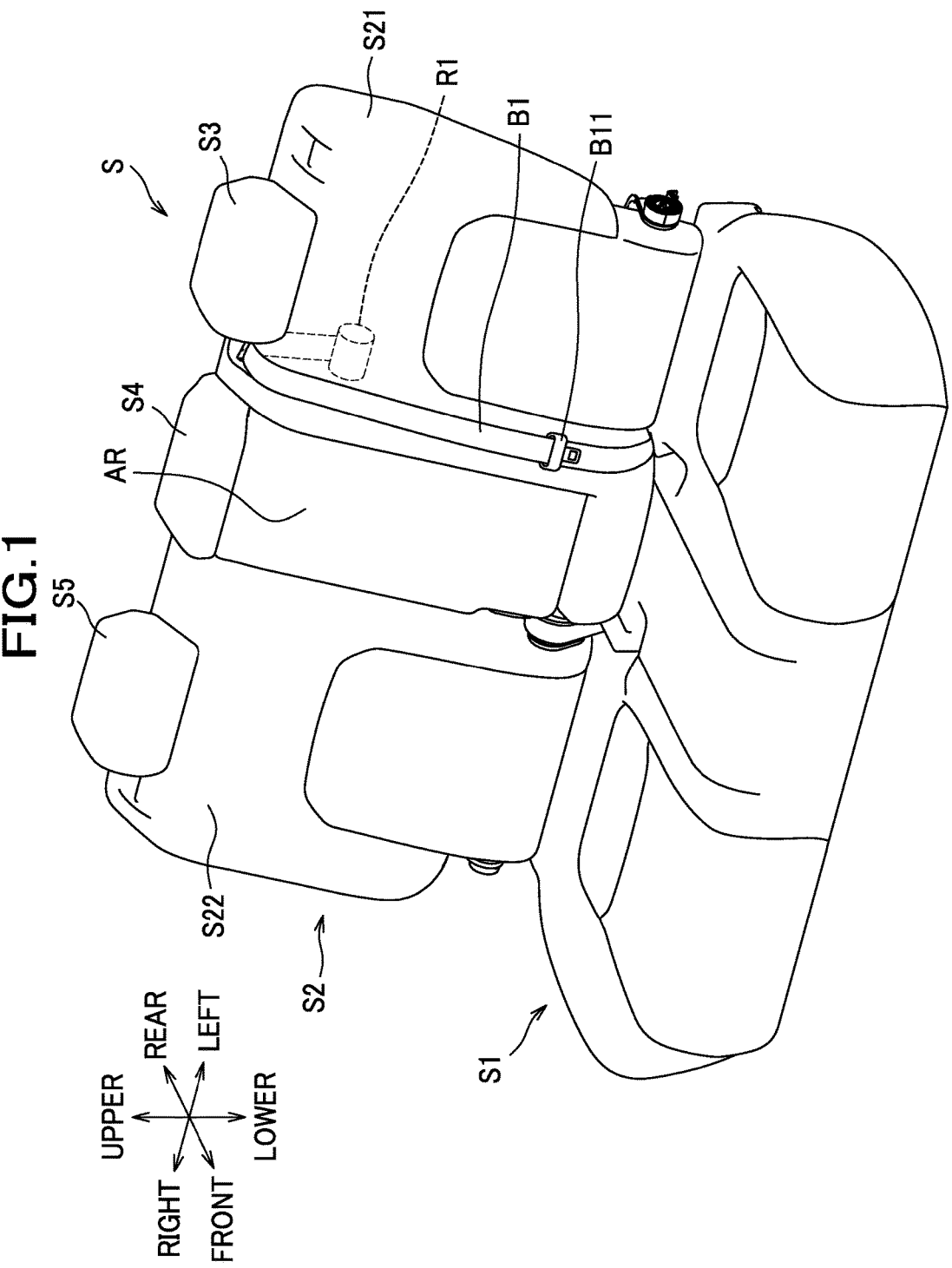
FIG. 1 is a perspective view of a car seat as an example of a vehicle seat.

As seen in FIG. 1, a vehicle seat according to this embodiment is configured as a car seat S installed in an automobile. The car seat S mainly includes a seat cushion S1, a seat back S2, headrests S3, S4, S5, a seat belt B1 for a center seat, a seat belt retractor R1 configured to retract the seat belt B1, and an armrest AR.

Figure 2:
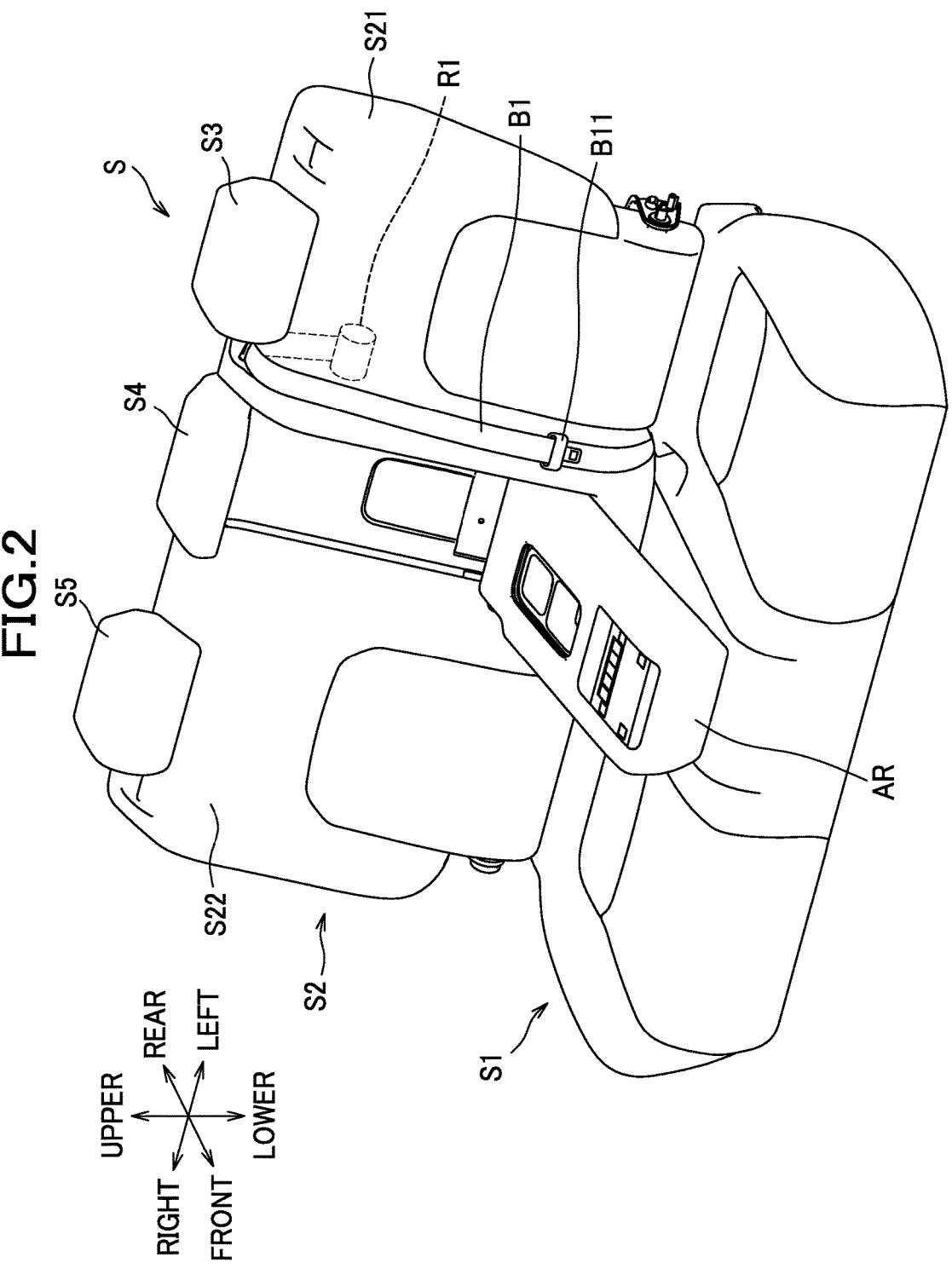
FIG. 2 is a perspective view of the car seat showing a use position of an armrest.

The armrest AR is supported by the seat back S2 and rotatable frontward and rearward with respect to the seat back S2 between a use position as shown in FIG. 2 in which position the armrest AR is to be used and a stowed position as shown in FIG. 1 in which position the armrest AR is retracted into the seat back S2. The armrest AR includes a frame (not shown), and the frame is upholstered with a pad material made of a cushion material such as urethane foam, and an outer skin material made of fabric or the like. In the following description, directions such as front, rear, lateral (right and left), vertical (upper and lower) are designated as from the viewpoint of an occupant seated on the car seat S.

The seat back S2 includes a first seat back S21 disposed on the left side and constituting a seat back for a center seat and a left seat, and a second seat back S22 disposed on the right side of the first seat back S21 and constituting a seat back for a right seat.

Figure 3:
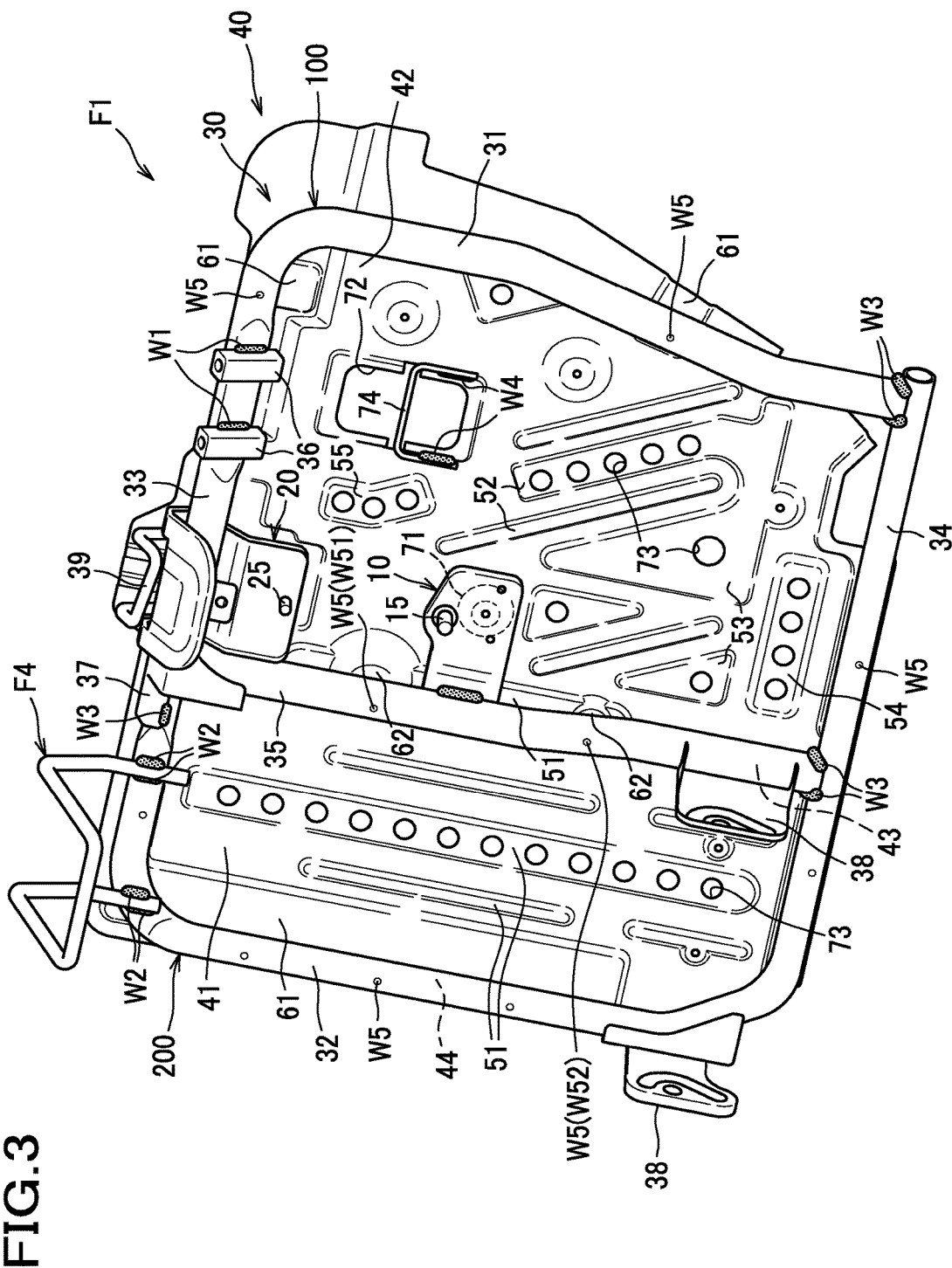
FIG. 3 is a perspective view of a seat back frame.

As seen in FIG. 3, the first seat back S21 mainly includes a seat back frame F1 as an example of a seat frame which constitutes a framework, a first bracket 10 and a second bracket 20 by which the seat belt retractor R1 is attached to the seat back frame F1. The first seat back S21 is configured such that the seat back frame F1 is upholstered with a pad material P1 (see FIG. 8) made of a cushion material, and an outer skin material P2 made of fabric or the like.

The seat back frame F1 mainly includes a pipe frame 30, and a back panel 40 as an example of a plate member.

The pipe frame 30 mainly includes left and right side frames 31, 32 disposed at a distance away from each other in a lateral direction, an upper frame 33 configured to connect an upper end portion of the left side frame 31 and an upper end portion of the right side frame 32, a lower frame 34 configured to connect a lower end portion of the left side frame 31 and a lower end portion of the right side frame 32, and a connecting frame 35 configured to connect the upper frame 33 and the lower frame 34. The connecting frame 35 is provided laterally inwardly of and at distances away from the left and right side frames 31, 32 and connects the upper frame 33 and the lower frame 34 on or in the proximity of laterally central portions of the upper frame 33 and the lower frame 34. In this embodiment, the side frame 31 is an example of the first frame, the side frame 32 is an example of the second frame, the upper frame 33 is an example of the third frame, and the lower frame is an example of the fourth frame.

Figure 4:
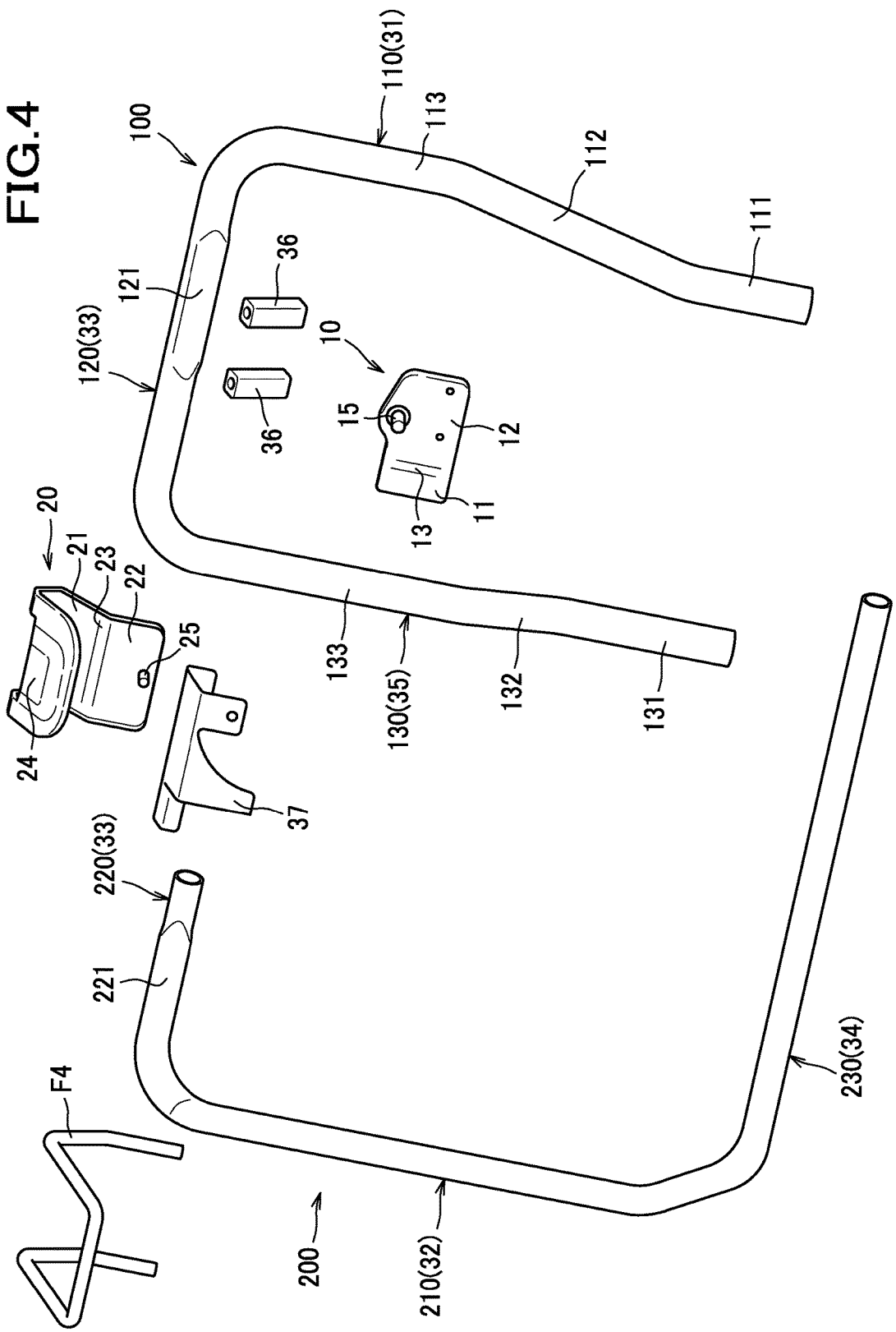
FIG. 4 is an exploded perspective view of a pipe frame.

As seen in FIG. 4, the pipe frame 30 includes a first pipe member 100 and a second pipe member 200.

The first pipe member 100 is formed by bending a metallic pipe member into a substantially U-shaped configuration and includes a longitudinal pipe portion 110, a lateral pipe portion 120 bent at an upper end of the longitudinal pipe portion 110 and extending rightward from the upper end of the longitudinal pipe portion 110, and a longitudinal pipe portion 130 bent at a right end of the lateral pipe portion 120 and extending downward from the right end of the lateral pipe portion 120.

The longitudinal pipe portion 110 constitutes the left side frame 31. As viewed from the front side, the longitudinal pipe portion 110 includes a first portion 111 extending substantially in the vertical direction, a second portion 112 extending from the upper end of the first portion 111 in an obliquely upward and laterally outward direction, and a third portion 113 extending substantially in the vertical direction from the upper end of the second portion 112. With this configuration, the seat back frame F1 is configured such that the lateral width of the upper end portion is greater than the lateral width of the lower end portion. Accordingly, the first seat back S21, in which the seat back frame F1 is upholstered with the pad material P1 and the outer skin material P2, can be configured such that the lateral width of the left seat is extended, for example, corresponding to a seat size of a large-side automobile.

The lateral pipe portion 120 constitutes a left-side portion of the upper frame 33 that is a part of the upper frame 33. A pair of right and left headrest-mounting brackets 36, 36 for mounting the headrest S3 (see FIG. 1) are welded to the front side of the lateral pipe portion 120 (see welds W1 in FIG. 3). The lateral pipe portion 120 has a flat portion 121 that is formed by flattening and deforming a part of the pipe member, and the headrest-mounting brackets 36, 36 are welded to the flat portion 121.

The longitudinal pipe portion 130 constitutes the connecting frame 35. As viewed from the lateral direction, the longitudinal pipe portion 130 includes a first portion 131 extending substantially in the vertical direction, a second portion 132 extending from the upper end of the first portion 131 in an obliquely upward and frontward direction, and a third portion 133 extending substantially in the vertical direction from the upper end of the second portion 132 (see also FIG. 7). It should be noted that, as viewed from the lateral direction, the longitudinal pipe portion 110 is also configured such that the second portion 112 extends from the upper end of the first portion 111 in an obliquely upward and frontward direction and is connected to the lower end of the third portion 113 that extends substantially in the vertical direction.

The second pipe member 200 is formed by bending a metallic pipe member into a substantially U-shaped configuration and includes a longitudinal pipe portion 210, a lateral pipe portion 220 bent at an upper end of the longitudinal pipe portion 210 and extending leftward from the upper end of the longitudinal pipe portion 210, and a lateral pipe portion 230 bent at a lower end of the longitudinal pipe portion 210 and extending leftward from the lower end of the longitudinal pipe portion 210. The diameter of the pipe that forms the second pipe member 200 is smaller than the diameter of the pipe that forms the first pipe member 100. In other words, the pipe constituting the second pipe member 200 is thinner than the pipe constituting the first pipe member 100.

The longitudinal pipe portion 210 constitutes the right side frame 32. Unlike the longitudinal pipe portion 110 of the first pipe member 100 that constitutes the left side frame 31, the longitudinal pipe portion 210 extends straight substantially in the vertical direction.

The lateral pipe portion 220 constitutes the right-side portion of the upper frame 33 that is the remaining part of the upper frame 33 excepting the portion constituted by the lateral pipe portion 120 of the first pipe portion 100. A headrest frame F4 which constitutes a framework for the headrest S4 of the center seat (see FIG. 1) is welded to the front side of the lateral pipe portion 220 (see welds W2 in FIG. 3). The lateral pipe portion 220 has a flat portion 221 that is formed by flattening and deforming a part of the pipe member, and the headrest frame F4 is welded to the flat portion 221. The headrest S4 is constituted such that the headrest frame F4 is upholstered with a pad material made of a cushion material and an outer skin material made of fabric or the like.

The lateral pipe portion 230 constitutes the lower frame 34.

As seen in FIGS. 3 and 4, the first pipe member 100 and the second pipe member 200 are joined together to form a pipe frame 30 by welding the lower end of the longitudinal pipe portion 110 and the left end portion of the lateral pipe portion 230, by welding the lower end of the longitudinal pipe portion 130 and a portion on or in the proximity of the laterally central portion of the lateral pipe portion 230, and by welding the left end of the lateral pipe portion 220 and the right end of the lateral pipe portion 120 through a connecting bracket 37 (see welds W3).

The back panel 40 is made by press working sheet metal and includes a first portion 41, a second portion 42, a third portion 43, and a fourth portion 44.

The first portion 41 is a portion surrounded by the right side frame 32, the upper frame 33, the lower frame 34 and the connecting frame 35, and located at the rear of an occupant seated on the center seat of the car seat S. The second portion 42 is a portion surrounded by the left side frame 31, the upper frame 33, the lower frame 34 and the connecting frame 35, and located at the rear of an occupant seated on the left seat of the car seat S. The third portion 43 is a portion located at the rear of the connecting frame 35. The fourth portion 44 is a portion located at the rear of the left and right side frames 31, 32, the upper frame 33 and the lower frame 34, and corresponds to a peripheral portion of the back panel 40.

Figure 5:
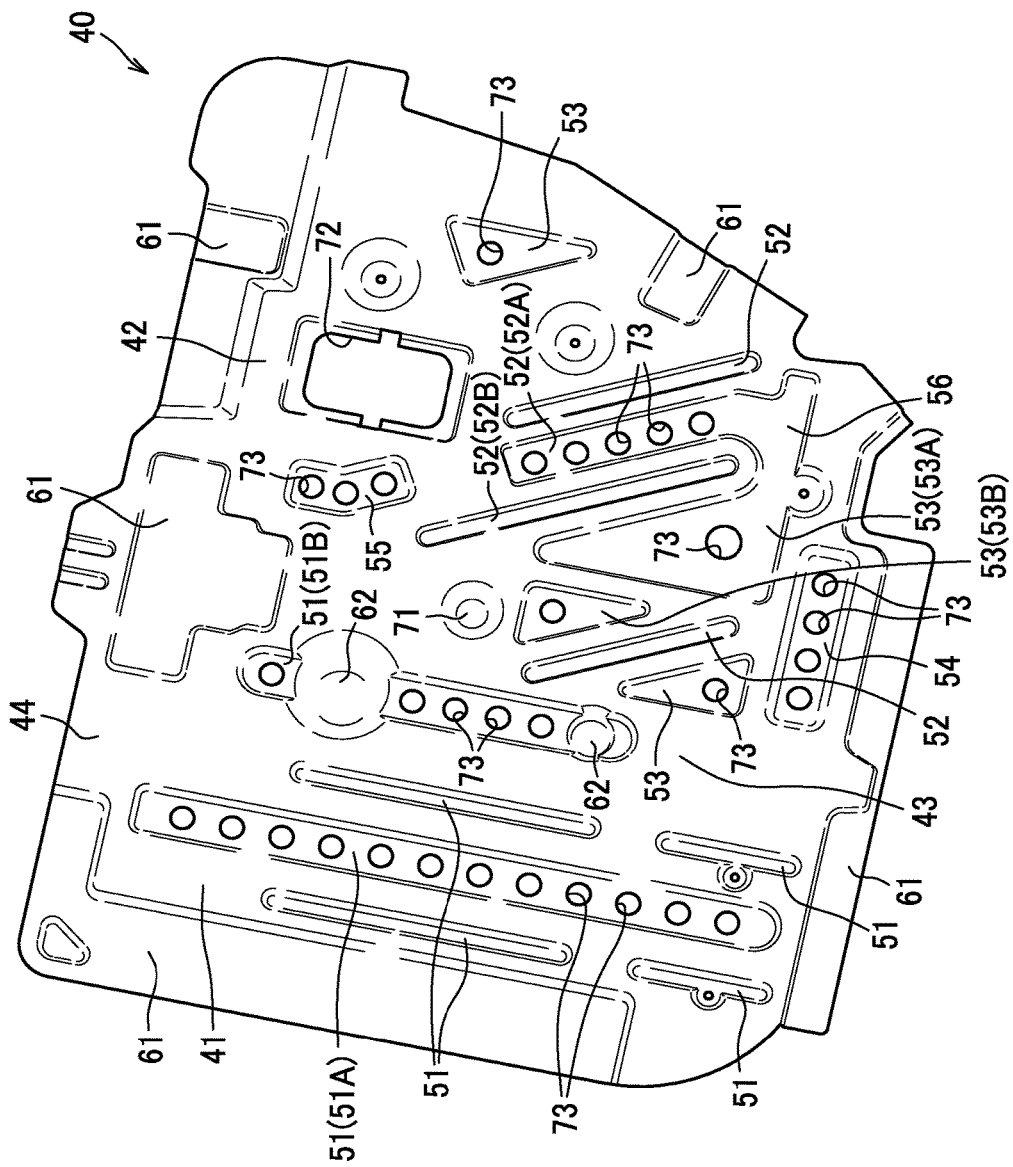
FIG. 5 is a perspective view of a back panel.

As seen in FIG. 5, the back panel 40 is provided with a plurality of protruding portions protruding toward the front side that is an example of an occupant side, to enhance the stiffness of the back panel 40. The plurality of protruding portions include first protruding portions 51, second protruding portions 52, third protruding portions 53, a fourth protruding portion 54 and a fifth protruding portion 55. Further, the plurality of protruding portions include first connecting protruding portions 61 and second connecting protruding portions 62 that are connected to the first pipe member 100 and the second pipe member 200 of the pipe frame 30. Further, the back panel 40 is provided with a bracket connecting portion 71 protruding frontward and having a substantially circular shape, and an opening 72 having a substantially rectangular shape.

The first protruding portion 51 is a protruding portion extending substantially in the vertical direction orthogonal to the lateral direction that is an example of a predetermined direction; a plurality of first protruding portions 51 are provided on the first portion 41 and on the third portion 43 such that they are arranged in line in the lateral direction. Of these plurality of first protruding portions 51, each of the wider first protruding portions 51A, 51B has a plurality of substantially circular through-openings 73; the through-openings 73 are arranged in line in the direction in which the first protruding portion 51A, 51B extends. Providing these through-openings 73 can serve to reduce the weight of the back panel 40, so that the weight of the seat back frame F1 can be reduced as a result.

The second protruding portion 52 is a protruding portion extending in a direction inclined with respect to the lateral direction; a plurality of second protruding portions 52 are provided on the second portion 42 such that they are arranged in line in the lateral direction. To be more specific, at an area of the second portion 42 from a portion on or in the proximity of the vertically central portion to the lower portion thereof, the second protruding portions 52 extend substantially parallel to a direction of a line connecting a portion on or in the proximity of the laterally central portion of the upper edge portion of the back panel 40 and the left end portion of the lower edge portion of the back panel 40. Of these plurality of second protruding portions 52, the wider second protruding portion 52A has a plurality of through-openings 73 arranged in line in the direction in which the second protruding portion 52A extends.

The third protruding portion 53 has a substantially triangular shape as viewed from the front side; one third protruding portion 53 is provided at the left end portion of the second portion 42, and a plurality of third protruding portions 53 are provided at the lower portion of the second portion 42. Each of the third protruding portions 53 has one through-opening 73. It should be noted that the left end portion of the third protruding portion 53A and the lower end portion of the second protruding portion 52A are connected by a connecting portion 56 to form an integrally protruding portion protruding toward the front side.

The fourth protruding portion 54 extends in the lateral direction, and is provided at the lower end portion of the second portion 42. The fourth protruding portion 54 has a plurality of through-openings 73 that are arranged in line in the direction in which the fourth protruding portion 54 extends.

The fifth protruding portion 55 includes an upper portion extending substantially in the vertical direction, and a lower portion extending from the lower end of the upper portion in a direction substantially parallel to the second protruding portion 52; the fifth protruding portion 55 is bent at the boundary between the upper and lower portions. The fifth protruding portion 55 is provided on or in the proximity of the laterally central portion of the upper portion of the second portion 42. The fifth protruding portion 55 has a plurality of through-openings 73.

The first connecting protruding portion 61 is connected to the left side frame 31, the right side frame 32, the upper frame 33 or the lower frame 34; a plurality of first connecting protruding portions 61 are provided on the fourth portion 44 that is the peripheral portion of the back panel 40.

The second connecting protruding portion 62 is connected to the connecting frame 35; a plurality of second connecting protruding portions 62 are provided on the third portion 43. To be more specific, each of the second connecting protruding portions 62 is a substantially circular protruding portion, and two second connecting protruding portions 62 are provided one above the other with a space provided therebetween. The second connecting protruding portions 62 are integrally formed with the first protruding portion 51B, and protrude frontward beyond the first protruding portion 51B.

The bracket connecting portion 71 is a portion to which the first bracket 10 is connected; one bracket connecting portion 71 is provided on or in the proximity of the vertically central portion of the right end portion of the second portion 42. The bracket connecting portion 71 is provided at a position between the two second connecting protruding portions 62 in the vertical direction. Further, the bracket connecting portion 71 is provided such that the right and left sides and the lower side thereof are surrounded by the second protruding portion 52B, the first protruding portion 51B and the third protruding portion 53B.

As seen in FIG. 3, the opening 72 is a through-opening through which a tether anchor 74 for engagement of a top tether of a child safety seat (not shown) is to be exposed; one opening 72 is provided adjacent to the left side of the fifth protruding portion 55. The peripheral portion adjacent to and surrounding the opening 72 protrudes frontward, so that a sufficient stiffness around the opening 72 is ensured. The tether anchor 74 is made of a wire member that is bent into a substantially U-shaped configuration, and both end portions of the tether anchor 74 are fixed to right and left edge portions of the opening 72 by welding (see welds W4).

The back panel 40 is disposed at the rear of the pipe frame 30, and the plurality of first connecting protruding portions 61 and the frames 31-34 are brought into contact and welded together, while the two second connecting protruding portions 62 and the connecting frame 35 are brought into contact and welded together, so that the pipe frame 30 and the back panel 40 are joined together (see welds W5). It should be noted that a sufficient space is ensured between the pipe frame 30 and the back panel 40 at a portion where the pipe frame 30 and the back panel 40 are not joined together, mainly due to the protruding and recessed shape of the back panel 40 (see FIG. 7). This can suppress abnormal noise such as chatter noise.

The armrest AR (see FIG. 1) is disposed between the right side frame 32 and the connecting frame 35 when it is in a stowed position. In this embodiment, a large storage space for the armrest AR is ensured because the second pipe member 200 constituting the right side frame 32 (longitudinal pipe portion 210) is made of a pipe member that is thinner than the first pipe member 100 constituting the connecting frame 35 (longitudinal pipe portion 130). With this configuration, the thickness of the pad material that covers a frame (not shown) of the armrest AR can be increased. Provided at the lower end portion of the right side frame 32 and at the lower end portion of the connecting frame 35 are a pair of armrest supporting brackets 38, 38 by which the armrest AR is rotatably supported.

Figure 6:
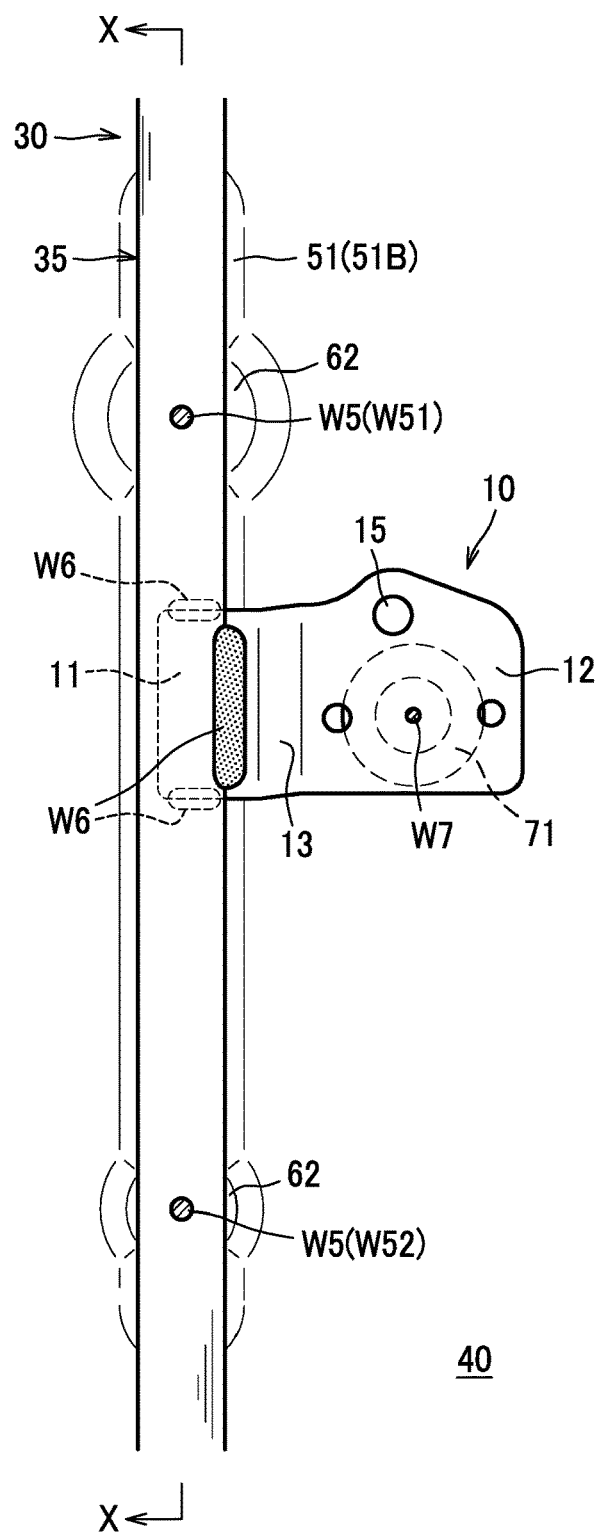
FIG. 6 is a view showing a structure of a part of the seat back frame in which a first bracket is provided, as viewed from the front side.
Figure 8:
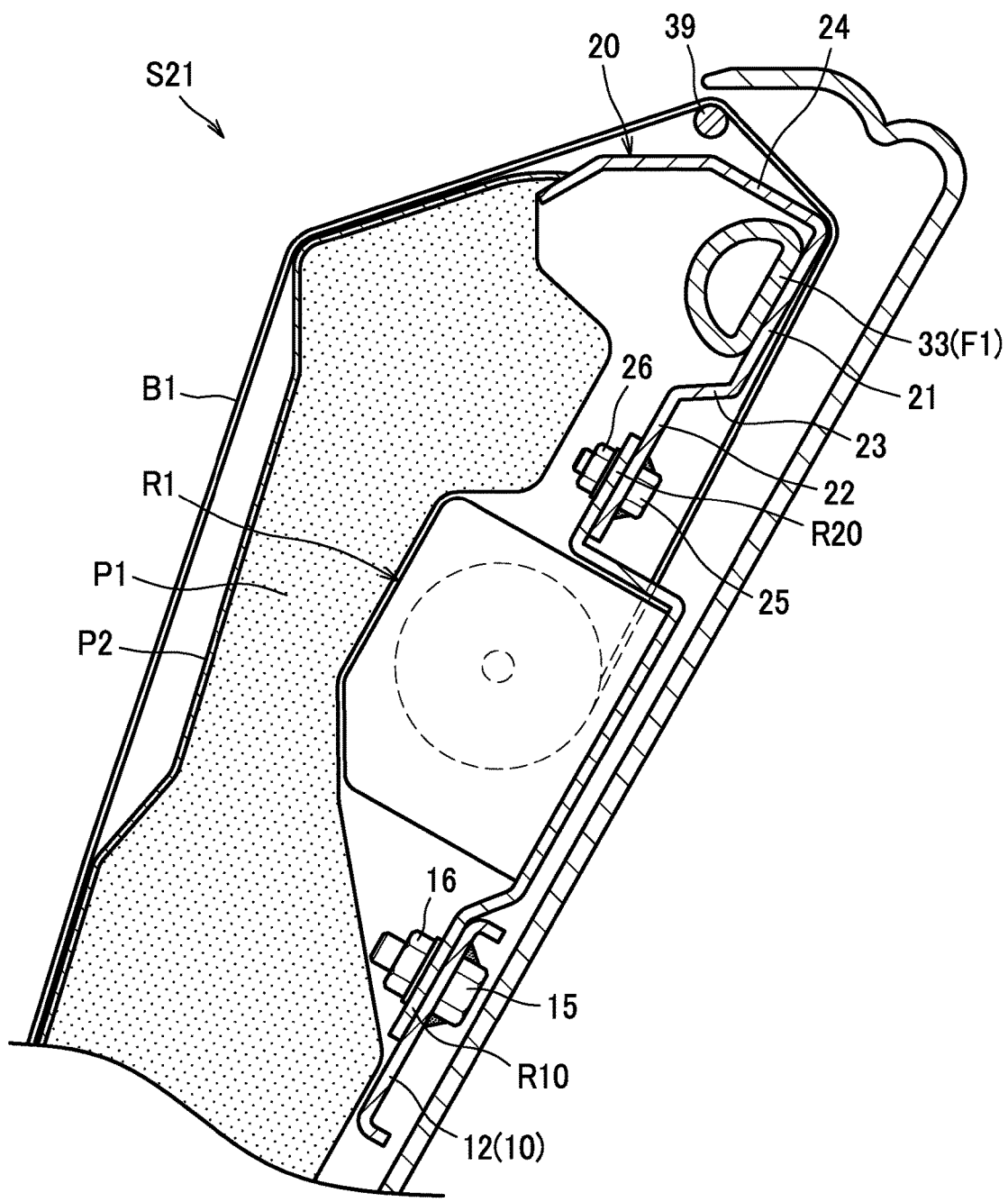
FIG. 8 is a sectional view showing a structure of a part of the seat back in which a seat belt retractor is provided.

As seen in FIG. 6, the first bracket 10 as an example of a bracket is made by press working sheet metal, and mainly includes an attachment portion 11 attached to the connecting frame 35, an anchorage portion 12 to which the seat belt retractor R1 is fixed, and a connecting portion 13 configured to connect the attachment portion 11 and the anchorage portion 12. The connecting portion 13 extends in an obliquely frontward and leftward direction from the left end of the attachment portion 11, and the anchorage portion 12 extends leftward from the left end of the connecting portion 13. As seen in FIG. 8, a bolt 15 for fixing the seat belt retractor R1 is provided on the anchorage portion 12. The bolt 15 is inserted through a through-opening (not shown) formed in the anchorage portion 12 from the rear side of the anchorage portion 12, and the bolt head thereof is fixed to the rear surface of the anchorage portion 12 by welding. Further, the peripheral edge portion of the first bracket 10 is bent rearward such that corner portions thereof form gently curved surfaces that protrude outside.

As seen in FIG. 6, the attachment portion 11 of the first bracket 10 is brought into contact with a portion on or in the proximity of the vertically central portion of the connecting frame 35 from the rear side of the connecting frame 35, and the upper edge portion, the lower edge portion and the front portion of the attachment portion 11 are joined by welding at three welding spots to the connecting frame 35 (see welds W6), so that the first bracket 10 is attached to the connecting frame 35 (pipe frame 30). Further, the anchorage portion 12 of the first bracket 10 is brought into contact with the bracket connecting portion 71 from the front side of the bracket connecting portion 71 and joined by spot welding (see welds W7) to the bracket connecting portion 71, so that the first bracket 10 is attached to the back panel 40.

Figure 7:
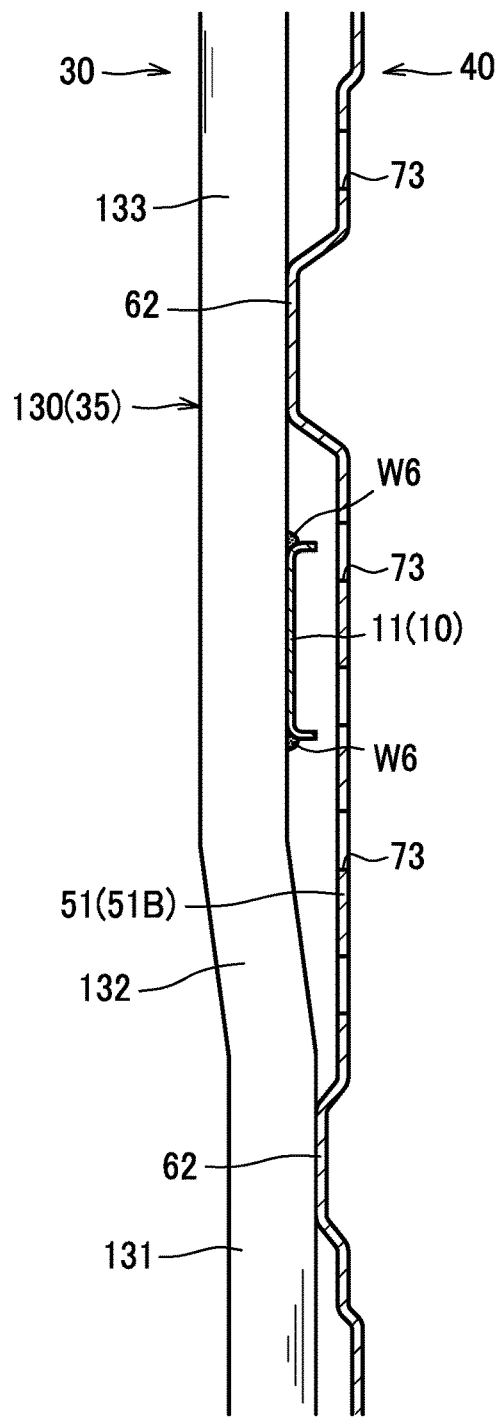
FIG. 7 is a sectional view taken along the line X-X of FIG. 6.

As seen in FIG. 3, the first bracket 10 attached in this way is located at a substantially central portion of the seat back frame F1 and disposed at the rear of the connecting frame 35 in such a position vertically and inwardly away from the upper frame 33 and the lower frame 34. As seen in FIG. 7, the attachment portion 11 is disposed between the connecting frame 35 and the back panel 40. A space is formed between the attachment portion 11 and the back panel 40.

Further, as seen in FIG. 3, in the vertical direction, the first bracket 10 is disposed in a position between the weld W51 that joins the connecting frame 35 and the upper second connecting protruding portion 62 and the weld W52 that joins the connecting frame 35 and the lower second connecting protruding portion 62, in other words, between two adjacent welds W51, W52 (i.e., joint portions). Further, as viewed from the front side, the first bracket 10 is located at a position avoiding the protruding portions 52-55 formed on the back panel 40. In other words, the protruding portions 52-55 are provided around the first bracket 10.

As seen in FIG. 8, the second bracket 20 is made by press working sheet metal, and mainly includes an attachment portion 21 joined to the upper frame 33, an anchorage portion 22 to which the seat belt retractor R1 is fixed, a connecting portion 23 connecting the attachment portion 21 and the anchorage portion 22, and a cover portion 24 extending frontward from the upper end of the attachment portion 21. The connecting portion 23 extends in an obliquely frontward and downward direction from the lower end of the attachment portion 21, and the anchorage portion 22 extends from the lower end of the connecting portion 23 in a direction substantially parallel to the attachment portion 21. Similar to the first bracket 10, a bolt 25 for fixing the seat belt retractor R1 is provided on the anchorage portion 22. In this embodiment, the diameter of the shank of the bolt 15 is larger than the diameter of the shank of the bolt 25.

The attachment portion 21 of the second bracket 20 is brought into contact with a portion on or in the proximity of the laterally central portion of the upper frame 33 from the rear side of the upper frame 33 and joined by welding to the upper frame 33, so that the second bracket 20 is attached to the pipe frame 30.

The seat belt retractor R1 is attached to the first bracket 10 and the second bracket 20, bridging a gap between the first bracket 10 and the second bracket 20. To be more specific, the seat belt retractor R1 is attached to the seat back frame F1 through the first bracket 10 and the second bracket 20 by inserting the bolt 15 through a through-opening (not shown) formed in a lower anchorage piece R10 and fastening the bolt 15 with the nut 16 and by inserting the bolt 25 through a through-opening (not shown) formed in an upper anchorage piece R20 and fastening the bolt 25 with the nut 26.

The seat belt B1 pulled out from the seat belt retractor R1 passes through the rear side and the upper side of the second bracket 20 and is wound around a guide wire 39 fixed to the upper frame 33 and thereafter pulled out to the front side of the first seat back S21. A tongue B11 (see FIG. 1) is attached to the seat belt B1, and the end portion of the seat belt B1 is connected to an anchor (not shown) that is fixed to the vehicle body.

According to this embodiment as described above, in contrast to the conventional car seat having a lateral frame provided between the upper frame and the lower frame and extending in a lateral direction for the attachment of the bracket, the lateral frame can be eliminated because the first bracket 10 is provided on the connecting frame 35. Eliminating the lateral frame between the upper frame and the lower frame can serve to improve the occupant's seating feeling because the occupant does not experience an uncomfortable contact feeling of the lateral frame. Further, eliminating the lateral frame makes it possible to reduce the number of parts for the seat back frame F1 and thus serves to suppress an increase in the number of the parts. Accordingly, the workload on the assembly of the seat back frame F1 can be reduced and the weight of the seat back frame F1 can be reduced. Reduction in the number of parts for the seat back frame F1 and reduction in the workload on the assembly leads to low-cost manufacturing of the seat back frame F1.

Further, the back panel 40 has protruding portions 51-55 protruding frontward, so that the stiffness of the back panel 40 constituting the seat back frame F1 can be improved and therefor the stiffness of the seat back frame F1 can be improved. Especially in this embodiment, the direction in which the first protruding portion 51 extends is different from the direction in which the second protruding portion 52 extends, and the shapes of the third protruding portion 53 and the like are different from the shape of the first protruding portion 51 and the shape of the second protruding portion 52, so that the stiffness of the seat back frame F1 can be further improved. Further, optimal stiffness can be set for each of portions of the back panel 40 by the arrangement and the combination of the first protruding portion 51, the second protruding portion 52, the third protruding portion 53 and the like.

Further, the first bracket 10 is disposed at a position avoiding the protruding portions 52-55, so that interference between the first bracket 10 and the protruding portions 52-55 of the back panel 40 can be suppressed.

Further, the seat back frame F1 includes the first pipe member 100 having a substantially U-shaped configuration, and the second pipe member 200 having a substantially U-shaped configuration. Therefore, the number of parts for the seat back frame F1 can be reduced further as compared with an alternative configuration in which the seat back frame includes, for example, a main pipe having a U-shaped configuration, an under pipe having a straight form and configured to connect lower end portions of the main pipe, and a sub-pipe having a straight form and configured to connect an upper portion of the main pipe and the under pipe. Further, since both of the first pipe member 100 and the second pipe member 200 have a substantially U-shaped configuration, and a bend structure is used where necessary as with the longitudinal pipe portions 110, 130 of the first pipe member 100, optimal stiffness and strength can be adjusted for each of portions of the seat back frame F1 without increasing (rather reducing) the number of parts for the seat back frame F1. With this configuration, for example, the structure around the longitudinal pipe member 130 (connecting frame 35) to which the first bracket 10 is attached can be reinforced more strongly. Further, a higher stiffness of the seat back frame F1 is ensured with a simple structure.

Further, since the second pipe member 200 is thinner than the first pipe member 100 and thus a large storage space for the armrest AR is ensured, the thickness of the pad material for the armrest AR can be increased, so that the cushioning feel of the armrest AR can be improved.

Further, since the first bracket 10 is provided at the rear of the connecting frame 35, it is possible to dispose the first bracket 10 in a position farther away from the occupant as compared with an alternative configuration in which the first bracket 10 is provided at the front of the connecting frame 35. Therefore, the distance between the occupant and the seat belt retractor R1 attached to the first bracket 10 can be increased. This makes it possible to increase the thickness of the pad material P1 disposed between the occupant and the seat belt retractor R1 and to further improve the occupant's seating feeling. Since the thickness of the pad material P1 is ensured, it is possible to dispose the first bracket 10 in such a position where the thickness of the pad material P1 is thinner as compared to the other portions of the seat back S2. This can improve the degree of flexibility in the attachment position for the first bracket 10.

Further, in the configuration in which the connecting frame 35 and the back panel 40 are joined together by the plurality of welds W51, W52, the first bracket 10 is disposed between two adjacent welds W51, W52 (i.e., the first bracket 10 is attached to the connecting frame 35 at a position between the weld W51 and the weld W52, where the connecting frame 35 is less likely to deform), the attachment strength of the first bracket 10 can be improved.

Further, since the attachment portion 11 of the first bracket 10 is disposed between the connecting frame 35 and the back panel 40, the attachment portion 11 can be arranged compactly. Accordingly, for example, the thickness of the pad material P1 disposed between the occupant and the seat belt retractor R1 attached to the first bracket 10 can be increased, so that the occupant's seating feeling can be improved.

Although one embodiment of the present invention has been described above, the present invention is not limited to the above-described embodiment. It is to be understood that various changes and modifications may be made to any of the specific configurations where necessary without departing from the scope of the present invention.

For example, in the above-described embodiment, the first pipe member 100 constitutes the left side frame 31, a part of the upper frame 33 and the connecting frame 35, whereas the second pipe member 200 constitutes the right side frame 32, the remaining part of the upper frame 33 and the lower frame 34. However, the present invention is not limited to this specific configuration. For example, the first pipe member may constitute the right side frame, a part of the upper frame and the connecting frame, and the second pipe member may constitute the left side frame, the remaining part of the upper frame and the lower frame. As an alternative, the first pipe member may constitute the left side frame, the connecting frame and a part of the lower frame, while the second pipe member may constitute the right side frame, the remaining part of the lower frame and the upper frame. As a further alternative, the first pipe member may constitute the right side frame, the connecting frame and a part of the lower frame, while the second pipe member may constitute the left side frame, the remaining part of the lower frame and the upper frame.

Further, in the above-described embodiment, the left and right side frames 31, 32 are illustrated as exemplifying a first frame and a second frame disposed at a distance away from each other in a predetermined direction, the upper frame 33 is illustrated as exemplifying a third frame connecting an end portion of the first frame and an end portion of the second frame, and the lower frame 34 is illustrated as exemplifying a fourth frame connecting another end portion of the first frame and another end portion of the second frame. However, the present invention is not limited to this specific configuration. For example, the first frame and the second frame may be upper and lower frames of the seat back, and the third frame and the fourth frame may be left and right frames of the seat back. Further, in the above-described embodiment, the seat back frame F1 is illustrated as exemplifying as a seat frame. However, the present invention is not limited to this specific configuration. For example, the seat frame may be a frame of the seat cushion. In this case, the first frame and the second frame may be left and right frames of the seat cushion, and the third frame and the fourth frame may be front and rear frames of the seat cushion. As an alternative, the first frame and the second frame may be the front and rear frames of the seat cushion, and the third frame and the fourth frame may be the left and right frames of the seat cushion.

Further, in the above-described embodiment, the first bracket 10 is disposed at a position avoiding the reinforcement protruding portions 52-55. However, the present invention is not limited to this specific configuration. The first bracket may be disposed at a position overlapping the reinforcement protruding portions as viewed from the front side or the rear side.

Further, in the above-described embodiment, a plurality of first protruding portions 51 are provided on the back panel 40. However, the present invention is not limited to this specific configuration. For example, only one first protruding portion 51 may be provided on the back panel 40. Further, as long as the stiffness of the back panel is ensured, the first protruding portions may not be provided. The same can be said of the second protruding portions and the third protruding portions.

Further, in the above-described embodiment, the back panel 40 is joined to both of the first pipe member 100 and the second pipe member 200 that constitute the pipe frame 30. However, the present invention is not limited to this specific configuration. For example, as long as the joint strength between the pipe frame and the back panel is ensured, the back panel may be joined to the first pipe member only or to the second pipe member only.

Further, in the above-described embodiment, the pipe frame 30 and the back panel 40 are joined together by welding. However, the present invention is not limited to this specific configuration. For example, the pipe frame and the back panel may be joined together using fastening means such as bolts and nuts, and other means. The same can be said of the joint of the pipe members that constitute the pipe frame.

Further, in the above-described embodiment, the car seat S to be installed in an automobile is illustrated as exemplifying a vehicle seat. However, the present invention is not limited to the car seat, and may be applicable to a vehicle seat to be installed in another vehicle other than an automobile, such as a rail car, a ship and an aircraft.

What is claimed is:

1. A vehicle seat including a seat frame, which comprises a first pipe member and a second pipe member,
    wherein the first pipe member is made of a single pipe bent into a U-shaped configuration, the first pipe member comprising a first pipe portion, a second pipe portion, and a third pipe portion connecting one end of the first pipe portion and one end of the second pipe portion, and the first pipe portion, the second pipe portion and the third pipe portion forming the U-shaped configuration of the first pipe member,
    wherein the second pipe member is made of a single pipe bent into a U-shaped configuration, the second pipe member comprising a fourth pipe portion, a fifth pipe portion having a length longer than that of the fourth pipe portion, and a sixth pipe portion connecting one end of the fourth pipe portion and one end of the fifth pipe portion, and the fourth pipe portion, the fifth pipe portion and the sixth pipe portion forming the U-shaped configuration of the second pipe member,
    wherein another end of the first pipe portion is joined to another end of the fifth pipe portion,
    wherein another end of the second pipe portion is joined to the fifth pipe portion between the one end and the another end of the fifth pipe portion, and
    wherein another end of the fourth pipe portion is connected to the first pipe member at a position away from the another end of the first pipe portion and the another end of the second pipe portion.

2. The vehicle seat according to claim 1, wherein the seat frame further comprises a plate member connected to at least one of the first pipe member and the second pipe member, and
    wherein the plate member comprises:
        at least one first protruding portion configured to protrude toward an occupant side that is a side of the vehicle seat on which an occupant is to be seated, the at least one first protruding portion extending in a direction orthogonal to a predetermined direction, the predetermined direction being a direction in which the fifth pipe portion extends; and
        at least one second protruding portion configured to protrude toward the occupant side and extending in a direction inclined with respect to the predetermined direction.

3. The vehicle seat according to claim 1, wherein the seat frame comprises a plate member connected to at least one of the first pipe member and the second pipe member, and
    wherein the plate member comprises at least one third protruding portion configured to protrude toward an occupant side that is a side of the vehicle seat on which an occupant is to be seated, the at least one third protruding portion having a triangular shape as viewed from the occupant side.

4. The vehicle seat according to claim 2, wherein the plate member further comprises at least one third protruding portion configured to protrude toward the occupant side and having a triangular shape as viewed from the occupant side.

5. The vehicle seat according to claim 1, further including a seat belt, a seat belt retractor configured to retract the seat belt, and a bracket by which the seat belt retractor is attached to the seat frame, and
    wherein the bracket is fixed to the second pipe portion.

6. The vehicle seat according to claim 5, wherein the seat frame further comprises a plate member joined to the second pipe portion through a plurality of joint portions, and
    wherein the bracket is disposed between two adjacent joint portions.

7. The vehicle seat according to claim 5, wherein the seat frame further comprises a plate member connected to at least one of the first pipe member and the second pipe member,
    wherein the bracket comprises an attachment portion attached to the second pipe portion, and
    wherein the attachment portion is disposed between the second pipe portion and the plate member.

8. The vehicle seat according to claim 6, wherein the seat frame further comprises a plate member connected to at least one of the first pipe member and the second pipe member,
wherein the bracket comprises an attachment portion attached to the second pipe portion, and
wherein the attachment portion is disposed between the second pipe portion and the plate member.

9. The vehicle seat according to claim 1, wherein the another end of the fourth pipe portion is joined to the third pipe portion.

10. A vehicle seat including a seat cushion, a seat back, and a seat back frame, the seat back frame comprising a first pipe member and a second pipe member,
wherein the first pipe member is made of a single pipe bent into a U-shaped configuration, the first pipe member comprising a first pipe portion, a second pipe portion, and a third pipe portion connecting one end of the first pipe portion and one end of the second pipe portion, and the first pipe portion, the second pipe portion and the third pipe portion forming the U-shaped configuration of the first pipe member,
wherein the second pipe member is made of a single pipe bent into a U-shaped configuration, the second pipe member comprising a fourth pipe portion, a fifth pipe portion having a length longer than that of the fourth pipe portion, and a sixth pipe portion connecting one end of the fourth pipe portion and one end of the fifth pipe portion, and the fourth pipe portion, the fifth pipe portion and the sixth pipe portion forming the U-shaped configuration of the second pipe member,
wherein another end of the first pipe portion is joined to another end of the fifth pipe portion,
wherein another end of the second pipe portion is joined to the fifth pipe portion between the one end and the another end of the fifth pipe portion, and
wherein another end of the fourth pipe portion is connected to the first pipe member at a position away from the another end of the first pipe portion and the another end of the second pipe portion.

11. The vehicle seat according to claim 10, wherein the another end of the fourth pipe portion is joined to the third pipe portion.

12. The vehicle seat according to claim 10, wherein the first pipe portion and the sixth pipe portion form side frames of the seat back frame, or the third pipe portion, the fourth pipe portion, and the fifth pipe portion form side frames of the seat back frame.

13. The vehicle seat according to claim 10, further including a pair of armrest supporting brackets by which an armrest is rotatably supported,
wherein the first pipe portion and the sixth pipe portion form side frames of the seat back frame, and
wherein the armrest supporting brackets are fixed to the second pipe portion and the sixth pipe portion at positions adjacent to the fifth pipe portion.

14. The vehicle seat according to claim 10, further including a seat belt, a seat belt retractor configured to retract the seat belt, and a bracket by which the seat belt retractor is attached to the seat back frame,
wherein the first pipe portion and the sixth pipe portion form side frames of the seat back frame, and
wherein the bracket is fixed to the second pipe portion.

15. The vehicle seat according to claim 14, further including a pair of armrest supporting brackets by which an armrest is rotatably supported,
wherein the armrest supporting brackets are disposed lower than the bracket, and
wherein in a width direction of the vehicle seat, the bracket extends away from the pair of armrest supporting brackets.

16. The vehicle seat according to claim 14, wherein the seat back frame further comprises a plate member joined to the second pipe portion through a plurality of joint portions, and
wherein the bracket is disposed between two adjacent joint portions.

17. The vehicle seat according to claim 14, wherein the seat back frame further comprises a plate member connected to at least one of the first pipe member and the second pipe member,
wherein the bracket comprises an attachment portion attached to the second pipe portion, and
wherein the attachment portion is disposed between the second pipe portion and the plate member.

18. A vehicle seat including a seat cushion, a seat cushion frame, and a seat back, the seat cushion frame comprising a first pipe member and a second pipe member,
wherein the first pipe member is made of a single pipe bent into a U-shaped configuration, the first pipe member comprising a first pipe portion, a second pipe portion, and a third pipe portion connecting one end of the first pipe portion and one end of the second pipe portion, and the first pipe portion, the second pipe portion and the third pipe portion forming the U-shaped configuration of the first pipe member,
wherein the second pipe member is made of a single pipe bent into a U-shaped configuration, the second pipe member comprising a fourth pipe portion, a fifth pipe portion having a length longer than that of the fourth pipe portion, and a sixth pipe portion connecting one end of the fourth pipe portion and one end of the fifth pipe portion, and the fourth pipe portion, the fifth pipe portion and the sixth pipe portion forming the U-shaped configuration of the second pipe member,
wherein another end of the first pipe portion is joined to another end of the fifth pipe portion,
wherein another end of the second pipe portion is joined to the fifth pipe portion between the one end and the another end of the fifth pipe portion, and
wherein another end of the fourth pipe portion is connected to the first pipe member at a position away from the another end of the first pipe portion and the another end of the second pipe portion.

19. The vehicle seat according to claim 18, wherein the another end of the fourth pipe portion is joined to the third pipe portion.

20. The vehicle seat according to claim 18, wherein the first pipe portion and the sixth pipe portion form side frames of the seat cushion frame, or the third pipe portion, the fourth pipe portion, and the fifth pipe portion form side frames of the seat cushion frame.

* * * * *